2 Sheets—Sheet 1.

J. TYLER.

RAG WASHING MACHINE FOR RAG AND PAPER WASHING ENGINES.

No. 10,042. Reissued Feb. 21, 1882.

Witnesses:
Fred H. Rugg
S. D. L. Woodbury

Inventor:
John Tyler

THE NORRIS PETERS CO., PHOTO-LITHO., WASHINGTON, D. C.

2 Sheets—Sheet 2.

J. TYLER.

RAG WASHING MACHINE FOR RAG AND PAPER WASHING ENGINES.

No. 10,042. Reissued Feb. 21, 1882.

Witnesses:
Ford H. Rugg
S. D. Woodbury

Inventor:
John Tyler

THE NORRIS PETERS CO., PHOTO-LITHO., WASHINGTON, D. C.

UNITED STATES PATENT OFFICE.

JOHN TYLER, OF CLAREMONT, NEW HAMPSHIRE.

RAG-WASHING MACHINE FOR RAG AND PAPER WASHING ENGINES.

SPECIFICATION forming part of Reissued Letters Patent No. 10,042, dated February 21, 1882

Original No. 216,585, dated June 17, 1879. Application for reissue filed May 21, 1881.

*To all whom it may concern:*

Be it known that I, JOHN TYLER, of Claremont, in the county of Sullivan and State of New Hampshire, have invented new and useful Improvements in Rag-Washing Machines for Rag and Paper Washing Engines, which improvements are fully set forth in the following specification, reference being had to the accompanying drawings.

My invention consists, first, in a method of controlling and regulating the outflow of water from the machine, by which a constant and sufficient supply may be retained therein at all times. This I accomplish by means of a bell-shaped outlet, and a movable concave head or gate controlled by a wheel and nut attached to the upper end of the shaft.

It consists, second, in a series of scroll-shaped metallic buckets with one or more inclined wings or guides on the inside of said buckets forcing the water through the cylinder to the outlet, thereby enabling the machine to be run at a higher rate of speed, and to discharge all the water before it passes the center, and to accomplish more work and doing it more effectively. The buckets are scroll-shaped, running from the center of the shaft to the circumference, and contain a number of graduated curved wings with varying angles toward the outlet of the washer, and when running at a high rate of speed the amount of water they discharge is thereby increased.

Figure 1:
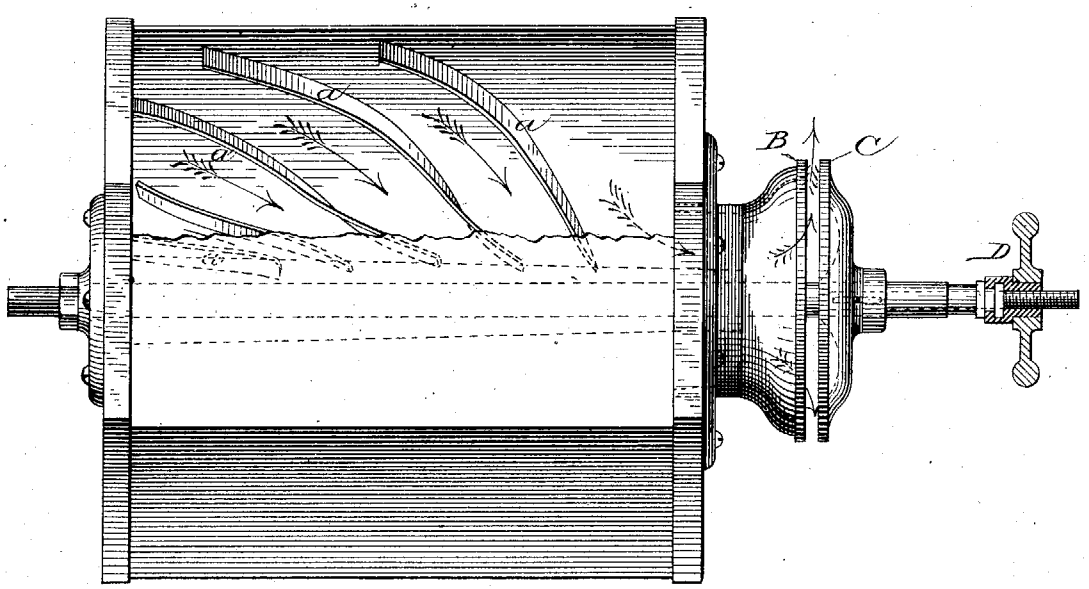
Figure 3:
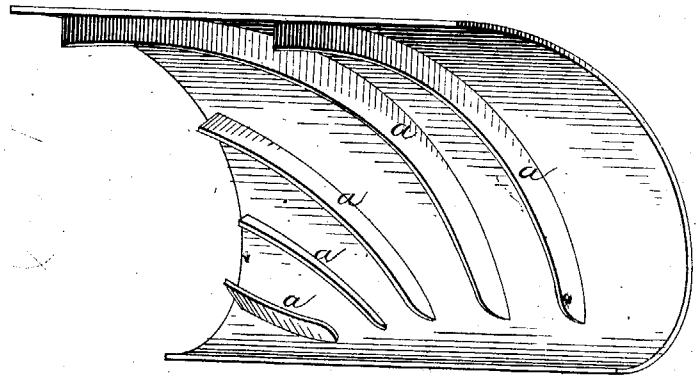

Figure 3 of the accompanying drawings is a perspective view of the bucket with graduated or curved wings or guides to conduct the water to the outlet, (represented by letter A.) Fig. 1 represents a side view of the rag-washing machine for rag and paper washing engines, with graduated curved wings or guides with varying angles to conduct the water to the outlet, the same as shown in Fig. 3, letter A.

A shaft which drives the washer passes through the whole machine. The outlet, letter B, is bell-shaped, and so constructed as to allow the water to run free from the washer.

There is a movable concave head or gate, letter C, that slides on the shaft of the washer by means of a rod running in the center of the shaft and fastened thereto, operated by a wheel and screw, letter D, on the end of the shaft, and the hub of the wheel is held in place by a groove in the shaft. This can be accomplished by a lever or other device; but the wheel and screw are preferred. The object of the concave movable head, letter C, is to work in connection with the bell-shaped outlet and to regulate the amount of water to be used, as in many cases there is not water enough to supply the washer at its full capacity and keep the rag-engine full of water. This device keeps the water in the engine at all times at the right height, and may be constructed as a concave or plane gate; but the concave head or gate is preferred. The outside of the cylinder is covered with wire-cloth, through which the water is admitted into the washer, but excludes the paper material. By closing this outlet with the movable head or gate the washer is made tight, and the water in this way clears the wire when it becomes clogged.

Figure 2:
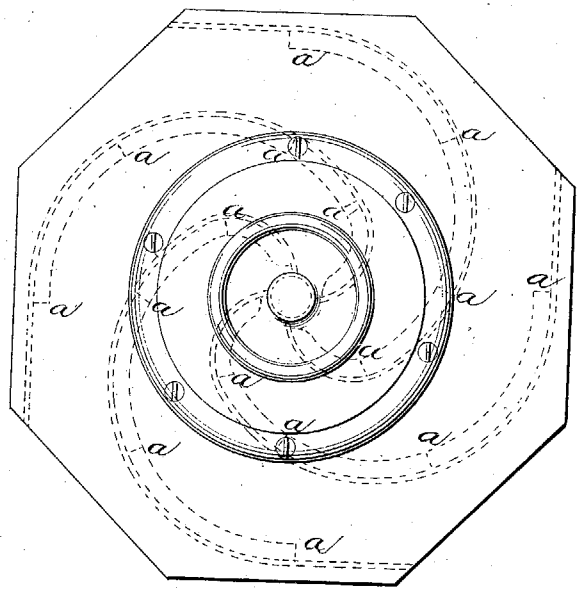

Fig. 2 is an end view, showing the scroll shape of the buckets with graduated and curved wings or guides attached. The outer end of the bucket is opposite the center of the shaft when it commences to run in the shape of a scroll; but varying this device does not impair its utility. The dotted lines represent the scroll-shaped buckets with the ends of the wings or guides marked A.

Having thus described my invention, I do not claim a cylinder washer for rag-washing engines having spiral interior buckets extending from the circumference to the central outlet, as substantially set forth; nor a cylinder washer for rag-washing engines having spiral interior buckets extending from the circumference toward and slightly past the central outlet, the inner edges of said buckets being flanged, substantially as and for the purpose described; nor a cylinder washer for rag-washing engines having spiral interior buckets extending from the circumference and toward and slightly past the central outlet, and being secured at an angle of inclination from the rear to the front head, substantially as and for the purpose specified; nor do I claim, in a cylinder washer for rag-washing engines, a spi-ral interior bucket made of a continuous piece of wood, substantially as and for the purpose described; but

What I claim, and desire to secure by Letters Patent, is—

1. The bell-shaped outlet B and the concave movable head C, in combination with the regulating-wheel and nut D, as and for the purpose herein described.

2. The curved wings or guides on the inside of the bucket, substantially as set forth.

3. A rag-washing machine for rag and paper washing engines with scroll-shaped buckets with one or more graduated and curved wings with varying angles running toward the center of the outlet, as represented in Fig. 1.

4. A movable head to a rag-washing machine for rag and paper washing engines, in combination with the outlet, substantially as and for the purpose described.

5. A gate attached to and sliding on a hollow cylinder, with which to regulate the discharge of water from the washer, in combination with the outlet, substantially as and for the purpose described.

JOHN TYLER.

Witnesses:
FRED H. RUGG,
S. I. L. WOODBURY.